United States Patent [19]
Drees et al.

[11] Patent Number: 6,154,681
[45] Date of Patent: Nov. 28, 2000

[54] ASYNCHRONOUS DISTRIBUTED-OBJECT BUILDING AUTOMATION SYSTEM WITH SUPPORT FOR SYNCHRONOUS OBJECT EXECUTION

[75] Inventors: Kirk H. Drees, Cedarburg; Jeffrey J. Gloudeman, Franklin; Donald A. Gottschalk, Wauwatosa; David E. Rasmussen, Dousman, all of Wis.

[73] Assignee: Johnson Controls Technology Company, Plymouth, Mich.

[21] Appl. No.: 09/054,733

[22] Filed: Apr. 3, 1998

[51] Int. Cl.⁷ .................................................. G05B 11/01
[52] U.S. Cl. ............................ 700/19; 700/100; 700/276
[58] Field of Search .............................. 700/19, 277, 275, 700/276, 100

[56] References Cited

U.S. PATENT DOCUMENTS

| | | | |
|---|---|---|---|
| 5,086,385 | 2/1992 | Launey et al. | 700/83 |
| 5,499,365 | 3/1996 | Anderson et al. | 707/203 |
| 5,568,378 | 10/1996 | Wojsznis | 700/44 |
| 5,586,021 | 12/1996 | Fargher et al. | 700/100 |
| 5,801,942 | 9/1998 | Nixon et al. | 700/83 |
| 5,901,058 | 4/1999 | Steinman et al. | 700/1 |

*Primary Examiner*—William Grant
*Assistant Examiner*—Paul Rodriguez
*Attorney, Agent, or Firm*—Quarles & Brady LLP; George E. Haas

[57] ABSTRACT

A computer-implemented building automation system is provided with an asynchronous object-oriented operating environment that is able to provide support for synchronous object execution with respect to real time, including those used to maintain closed-loop control over a system. The operating environment for supporting standard objects includes a clock mechanism for maintaining time and a scheduling mechanism for initiating the methods associated with the standard objects. A control method (i.e. PID control method) of a first standard object is scheduled for execution at a predefined schedule time with the schedule mechanism, and at some later time is initiated by the schedule mechanism. Upon execution, the control method determines an actual time of initiation by reading the clock mechanism and adjusts its control method using this actual time when the actual time exceeds the schedule time. More specifically, the actual time is determined by reading an elapsed time from the clock mechanism and computing a difference between this elapsed time and a start time that was determined by reading the clock mechanism at the time the control method was scheduled.

7 Claims, 7 Drawing Sheets

ASYNCHRONOUS DISTRIBUTED-OBJECT BUILDING AUTOMATION SYSTEM WITH SUPPORT FOR SYNCHRONOUS OBJECT EXECUTION

BACKGROUND AND SUMMARY OF THE INVENTION

The present invention relates generally to building automation systems. More particularly, the invention relates to an event-driven or asynchronous object-oriented control system that is able to provide support for synchronous object execution with respect to real time, including those used to maintain closed-loop control over a system.

Many of the control systems within a building automation environment employ closed-loop control. A feedback signal is derived from the output of a controller or device and that signal is compared with the input signal to calculate an error signal. The error signal is then used to change the setting of the device or controller, causing the output to more closely match the desired input.

Originally, control systems were constructed using analog components, in which case, the input and output signals and the error signal were continuous with respect to time. The voltage level at any point in time thus represented the signal value. According to well-known control theory the performance of these analog systems could be modified and improved by altering the feedback signal in a time-dependent manner. For example, one common closed-loop control architecture uses proportional integral derivative (PID) control to improve closed-loop performance. In the classic PID control, the system under control is mediated by three components: a proportional component, an integral component and a derivative component. The proportional component is obtained by multiplying the feedback signal by a predetermined constant. The integral component is obtained by integrating the feedback signal with respect to time. The derivative component is determined by taking the derivative of the feedback signal with respect to time.

When digital control systems were introduced, they were originally designed to mimic the behavior of the earlier analog systems. Thus digital techniques were developed to periodically sample the output of devices and controllers, so that the sampled output could be used as a feedback signal for closed-loop control. Various control algorithms, such as the PID control algorithm, were then adapted for digital control by using the sampling rate of the digital signal as the time base for performing derivatives and integrals. Thus the PID control algorithm is by its nature synchronous with respect to a predetermined clock.

Because many control processes require some form of synchronicity with respect to time, conventional building automation systems are engineered to guarantee that all synchronous operations are performed within certain allotted time frames. Typically this is done by defining an operating cycle and by then assigning different portions of that cycle to different control processes. In this way the entire system is engineered to be synchronous with the predefined cycle. In essence, the control algorithm is merely performing a repeating loop that is synchronized to execute fully from start to finish within the predefined cycle.

While synchronous control software can be used advantageously in smaller systems, the requirement of imposing synchronicity becomes a deterrent when complex distributed systems are involved. But for the need to support synchronous operation, complex building automation systems might be better implemented using event-driven asynchronous technology. However, heretofore the asynchronous model has not worked well in building automation applications, because many of the subsystems (such as PID controllers) require synchronous execution.

In a truly asynchronous operating environment there is no guarantee that a given process will run from start to end within a given time. In turn, a subsequent process may not begin to run at its schedule time. Thus, the second process cannot be guaranteed to run from start to end within a predefined time interval and this has traditionally ruled out the inclusion of a deterministic or synchronous with respect to real-time control process within an asynchronous operating environment.

To address this problem, the invention provides a distributed-object building automation system that provides full support for synchronous object execution. Specifically, the invention provides real time support for standard control objects that automatically alters their process and/or its data based on a measurement of elapsed time. The process thus yields the results that would be obtained through synchronous execution, even though the process may not have been performed in synchronism with a defined time interval.

For a more complete understanding of the invention, its objects and advantages, reference may be had to the following specification and to the accompanying drawings.

DESCRIPTION OF THE PREFERRED EMBODIMENT

Figure 1:
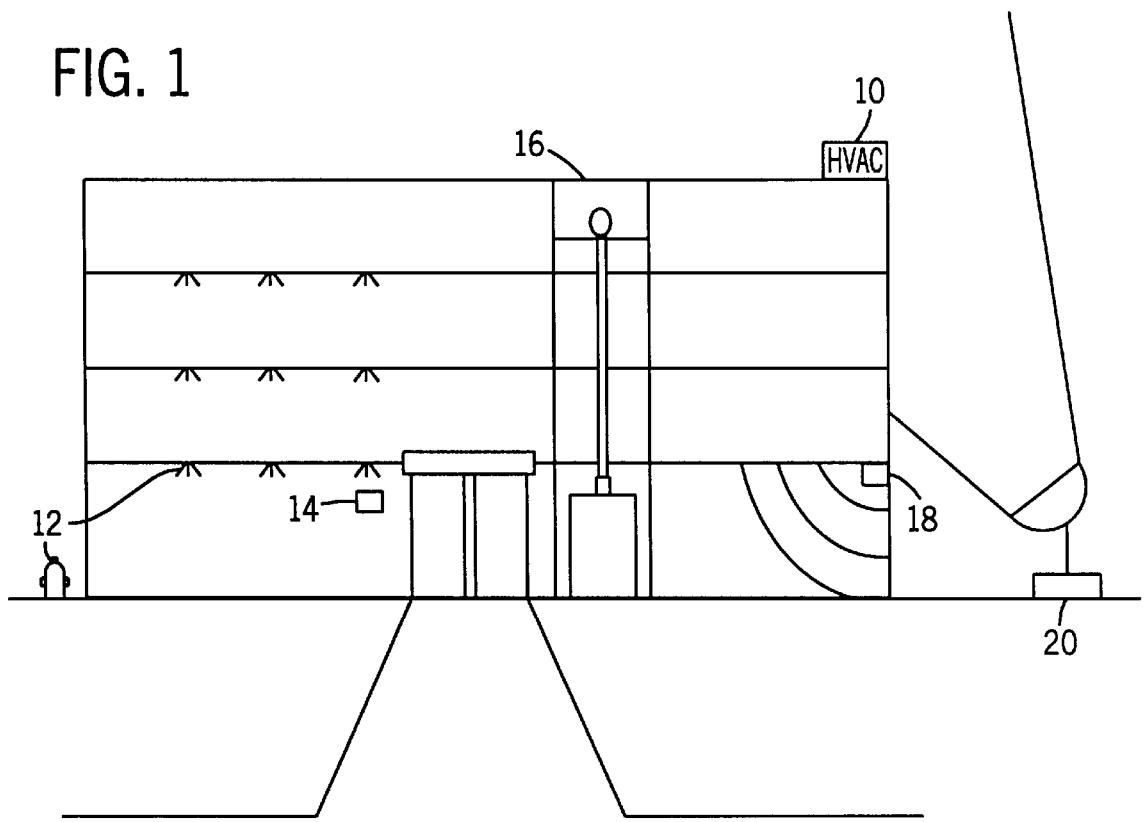
FIG. 1 is a diagrammatic view of a building environment, illustrating the building automation system of the invention in an exemplary application.
Figure 1:
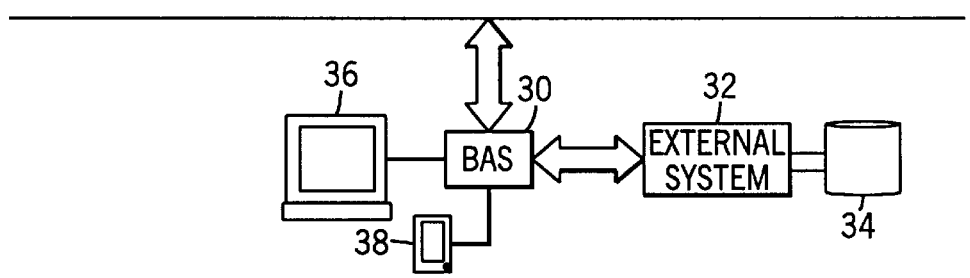

The building automation system of the invention provides a computer hardware and software architecture that supports powerful object-oriented system development. The building automation system can be used to monitor, collect data and control a multitude of different facilities management devices and applications. By way of illustration, FIG. 1 shows an exemplary facilities management application within a building that includes a heating and cooling system 10, fire alarms and sprinkler system 12, security system 14, elevator control system 16, intrusion alert system 18 and lighting control system 20. Although not explicitly illustrated, the exemplary facilities management application will typically also include such other building system services as sewer and water, waste management, landscape irrigation and maintenance, parking lot and sidewalk maintenance, and physical plant inventory control.

The building automation system 30 of the invention is designed to electronically communicate with the aforementioned building systems, either by direct hardwire connection or through wireless communication; or, by accessing information stored in data files maintained by other systems within the facility. The building might have an existing heating and air-conditioning (HVAC) system that must be integrated into the system of the present invention. Such an external system, illustrated at 32, can be readily connected to the building automated system 30 through the third party interface provided by the building automated system 30. The external system 32 may include its own information storage component such as database 34. The building automation system 30 of the invention maintains several data stores and provides the data migration capability to obtain and store information originally found in database 34 by communicating with external system 32. The building automation system 30 also provides a user interface through which the human operator can interact with the building automation system through a variety of different user interfaces. To illustrate some of the possible interfaces, a monitor 36 and a personal digital assistant (PDA) 38 have been illustrated. These user interface devices can be connected to the building automation system by wire, wireless communication, local area network (LAN), wide area network (WAN), or through some other suitable communication lengths such as a telephone connection or the Internet.

A standard object is a fundamental building block used by an application engineer to compose a building automation application. The definition of each standard object type includes a list of attributes defined for that object type as well as the behavior of that object. Attributes are data values which are unique for each instance of the object type. The behavior (or method) is the logic performed by the object on its attributes. All objects support a minimum set of attributes and methods. Methods that support attribute access, object type information, snapshot views, and a general command mechanism are required for a standard object to fully function in the building automation system.

To support standard objects in a building automation system, the present invention provides an operating environment that is portable to various types of building automation devices. An operating environment describes the basic support functions that a device has for the standard objects it is providing access to. Standard objects are distributed across various types of building automation devices (i.e., VMA, ZS200, ZS300 and other product types). These different types of devices utilize different types of operating systems as the basis for their operating environment. A real time operating system in conjunction with various other support libraries and tasks make up the operating environment for a device. Since a building automation device's support for a particular operating system is a result of the restrictions of the hardware and other varying requirements associated with the device type, an Object Engine serves as an interface between the standard objects of a building automation applications and the operating system supported by each type of device.

An Object Engine is the specific operating environment developed for use in the building automation system of the present invention. Although the Object Engine software requires a certain level of functionality from the operating system that resides on each device, it also provides specific support functions for the building automation applications. To maximize reuse, most of the code for the Object Engine is organized into platform independent libraries. This library approach allows the Object Engine to provide a consistent interface between standard objects and the operating system that resides on a particular platform. It is important that all devices provide a similar interface to the standard objects that they support that is independent of the device's particular operating system. It should also be noted that the actual code that packages the Object Engine is platform specific. An exemplary list of devices and operating systems supported by the Object Engine are as follows:

| Device Product | Operating System |
| --- | --- |
| ZWS, MGT | Windows95, WindowsNT |
| ZS200, ZS300 | RTOS86, RTOS386 |
| VMA | RTOS11 |

The Object Engine is packaged as a single "task" within the operating system of the device. Task is a generic term that might also be referred to as an application or thread in Windows, a process in Unix or a task in the RTOSXXX operating systems. Task refers to a sequence of actions being performed by the computer under control of the operating system in the device. All of the operating systems that support the Object Engine allow multiple tasks to be defined in a device.

Figure 2:
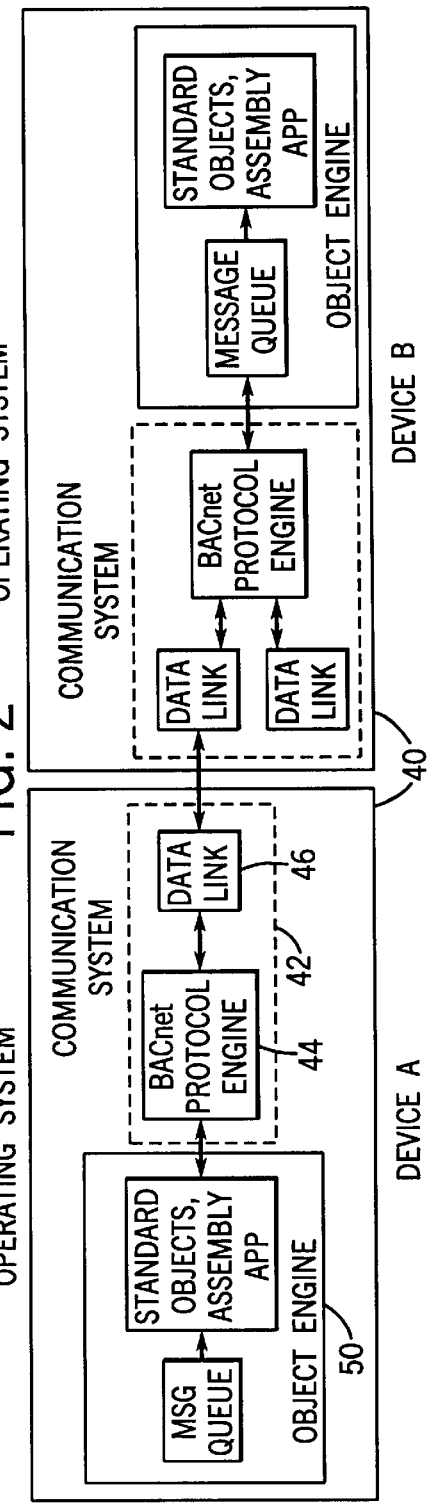
FIG. 2 is a block schematic diagram of the basic tasks residing in the operating system on a building automation device of the present invention.

As shown in FIG. 2, a communication system 42 and an Object Engine 50 residing in the device's operating system 40 are the basic tasks needed to support a building automation application of the present invention. A communication system task 42 is responsible for receiving messages from one of the device's communication ports, determining if any particular message is for the device, and if so routing the message to the Object Engine 50 residing on that device. The communication system 42 includes a protocol translator engine 44 and at least one data link 46 for receiving messages. Although the protocol engine 44 currently supports decoding and encoding BACnet messages, it is envisioned that different types of protocol engines could be interchanged for interfacing between Object Engine 50 and other communication protocols.

The Object Engine task 50 provides control over all messages sent to objects within the device. Messages can originate from a variety of sources, including the Protocol Engine 44 (i.e. messages from objects on other devices), objects within the Object Engine 50, and a computer-human interface task or other task residing on the device. In general, the Object Engine 50 will receive a message from one of these possible sources and pass the message to the appropriate destination object. Object Engine 50 will receive messages from the underlying operating system and queue those based on priority. Object Engine 50 will also queue messages to objects based on internal timing functions.

Since it is possible for messages to be received by Object Engine 50 faster than it can process them, the Object Engine supports a priority mechanism to determine the next message to be processed. The priority mechanism currently supports four message priorities, such that higher priority messages will be processed before lower priority messages. A message is then delivered to the appropriate method of an object based on priority of the request. When a message to an object is processed it will assume to be processed to completion.

In addition to providing a means for communicating between standard objects, this message architecture also supports scheduling requests for standard object execution. A scheduling mechanism (i.e. timer database) 54 provides support for queuing and retrieving messages to objects based on priority, as well as queuing messages that need to be sent following a timeout period. In other words, an object can schedule any message to another object or itself via calls to scheduling mechanism 54. An Execute command is a message that invokes the EXECUTE method (i.e. its primary building automation method) of a standard object. A Trigger command is the message that schedules an object run its EXECUTE method at some later time. Scheduling mechanism 54 monitors its queue and at the appropriate time initiates an object's scheduled method.

Figure 3:
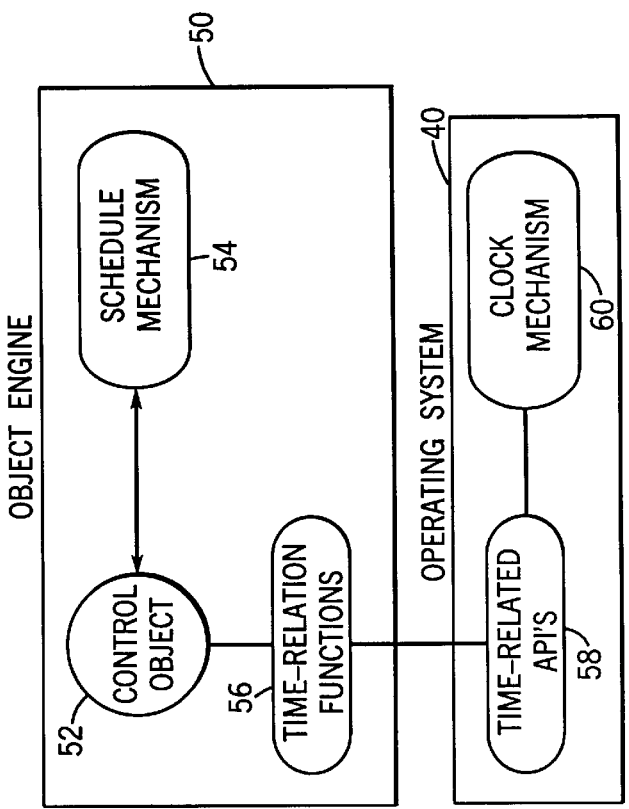
FIG. 3 is a block schematic diagram of the basic components for providing time support functions in the operating environment of the building automation system of the present invention.

Thus, standard objects can be configured to execute periodically. For instance, the EXECUTE method of a standard PID object may be scheduled to run every 2 seconds. In FIG. 3, control object 52 schedules an EXECUTE message to be sent to itself following a timeout period via scheduling mechanism 54. In this case, control object 52 may be required to execute in a predefined time period, such that the units for this time period are in seconds. To assess the accuracy of such timing requests, control object 52 accesses a clock mechanism 60 that resides in operating system 40. Time-related function calls 56 are found the platform independent libraries of Object Engine 50. Using these function calls 56, control object 52 interfaces with clock mechanism 60 through various time-related API's 58 provided by each particular operating system.

When administering scheduling, the Object Engine attempts to take into account fluctuations in timing by the platform specific operating system and adjust its timing requests accordingly. The net effect of this is to try and make the timing requests by the different objects as accurate as possible. However, the accuracy for shorter timeout periods is much more difficult to estimate because it is very dependent on what else is defined in a device. Certainly it is possible to schedule more objects to run than the device has time for within a given time period. Assuming too many objects were not scheduled to run, how accurate can the Object Engine adjust the execution timing for a particular object? Since the Object Engine will never preempt an executing object to run a different one, the execution of an object can be delayed by at least the execution time of the any object. If the slowest object that can execute takes 100 msec (worst case), then the timing of an object that has had its period timeout and is waiting to execute, can be delayed by up to 100 msec. To illustrate, assume the worst case for object execution is 100 msec and a control object is set up to run every 2 seconds. A possible scenario of execution for this control object could be as follows:

---
1  2  3  4  5  6  7  8  9  10
Time in seconds
object execution times from 0 time are:
2.05, 4.01, 6.1, 8.02, 10.01
period variations for this example are:
2.05, 1.96, 2.09, 1.92, 1.99

---

High priority execution requests are another factor that causes fluctuations in the execution timing of an object with a lower priority request. In this case, the wait can vary significantly depending on the number of higher priority requested objects are waiting to execute at a given time. Fortunately, this factor can be controlled by setting the priority of only a limited number of critical applications to a higher priority than other applications.

Within the context of this operating environment, certain types of standard objects have algorithms that need to run periodically and can be negatively impacted by variations in that period. Since it is virtually impossible for an asynchronous operating environment such as the Object Engine to guarantee that there will be no variations in the period there needs to be a way that such objects can be implemented to adjust for variations. However, the operating environment of the present invention provides support in the form of function calls that allow an object to measure the exact time that has elapsed since the last time it ran. A methodology 70 for providing this support is illustrated in FIG. 4.

Figure 4:
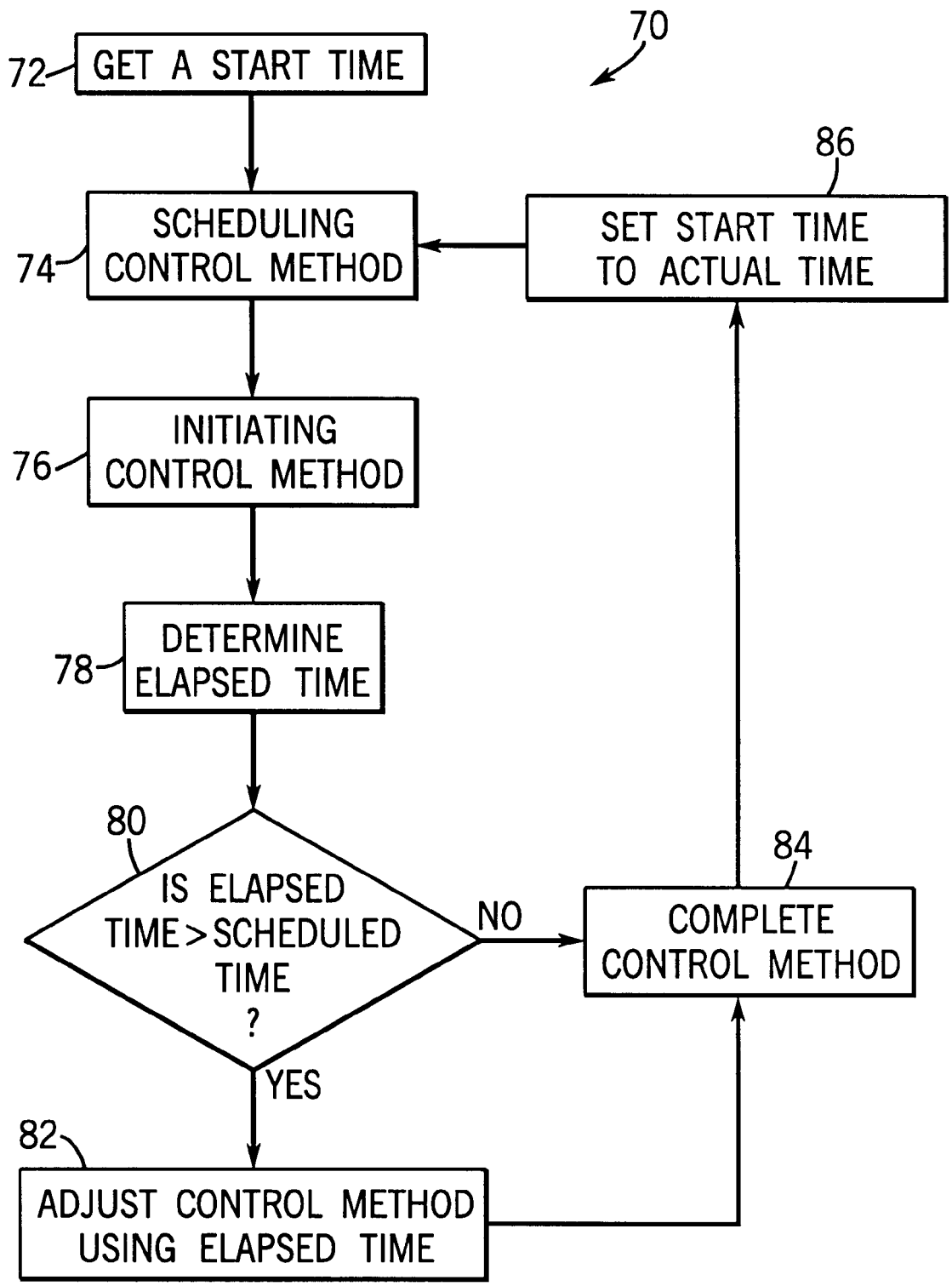
FIG. 4 is a flow diagram showing the methodology for providing synchronous object execution with respect to real time in the operating environment of the present invention.

Referring to FIG. 4, block 72 gets a start time when a standard control object is first instantiated in the operating environment. For instance, in its STARTUP method, a standard object may make a function call (i.e. OSgetstarttime(pointerToStartTime)) to get a baseline value from the operating system. In block 74, the control object interfaces with a scheduling mechanism to schedule the execution of its control method:

//The object then schedules its EXECUTE method to run on the period

//it would like to be run at timerScheduleMe(requestedTime, EXECUTE);

When the scheduled period expires or "times out" the method of the object that has the scheduled control algorithm (i.e. EXECUTE method) will be initiated by the scheduling mechanism in block 76. At this time, the control object determines the elapsed time in block 78 by using a second function call in its control method to retrieve the elapsed time since scheduling the method:

//Get the time elapsed since the last time we got to this method elapsedTime=OSgetelapsedtime(pointerTostartTime)

Decision block 80 evaluates any variation the scheduled execution time by comparing the elapsed time against the requested schedule time. If the elapsed time has exceeded the scheduled time, then the elapsed time can be used by the control algorithm to adjust for variations in the period in block 82. Regardless of this evaluation, the process completes the control method in block 84. ElapsedTime (in microseconds) is available on all platforms supported by the Object Engine. Exemplary source code from the Object Engine for supporting the above-described function calls in three particular operating environments has been set forth in Appendix A. Lastly, the control method sets its start time equal to the actual time in block 86, such that the control object can continue to monitor variations in the next scheduled execution time.

Figure 5:
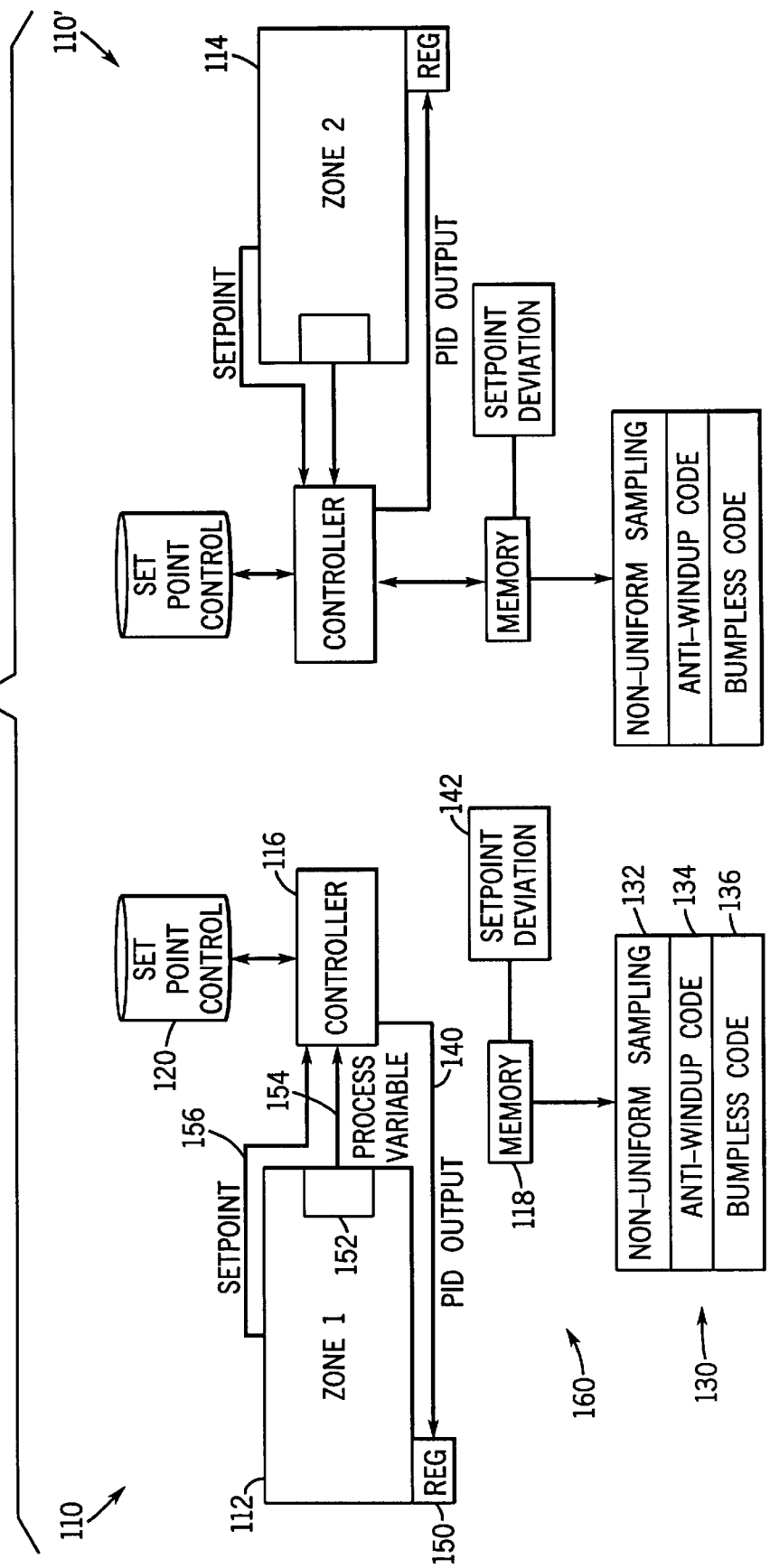
FIG. 5 is a block schematic diagram of a feedback control system in a building automation system of the present invention.

A standard PID object is discussed in conjunction with FIGS. 5–8 to illustrate how a control object might utilize the present invention to adjust its control algorithm. Referring to FIG. 5, an overall block schematic diagram of feedback control systems are shown generally at 110 and 110'. In this example, the systems are used to satisfy the temperature setpoint associated with particular dedicated temperature zones, such as the zone 112 and the zone 114, based on the deviation between a measured zone temperature and the zone setpoint temperature, as will be set forth in detail below. For purposes of further discussion, reference will be made only to temperature control of the zone 112, as the control scheme for both zones 112 and 114 is identical.

The system 110 includes a controller 116 having an associated memory 118. The controller is programmed with a setpoint control logic, indicated generally at 120. More particularly, memory 118 contains a standard PID object that encapsulates the setpoint logic in its control method. The control method includes a block of control code 130 which has been programmed through programming techniques well known in the art. The block of control code 130 includes a non-uniform sampling code block 132 that allows the PID setpoint control logic, and specifically the integral and derivative functions, to operate on non-uniform sampling intervals. The non-uniform sampling code block 132 enables the integral contribution to be calculated with a second order accuracy. The controller therefore is not required to sample and execute on a fixed interval.

The non-uniform sampling is accomplished by programming trapezoidal integration logic into control code 130. The trapezoidal integration logic provides a numerically more stable system than compared to conventional rectangular integration-based PID closed loop systems. The trapezoidal integration technique, however, is a two-point method that requires just the current and previous process variable values for system operation and therefore does not require time intervals to be uniformly spaced. The non-uniform sampling period therefore only requires the presently sensed process variable value and an immediately past sensed process variable value for system operation. In addition, control code 130 is programmed with anti-windup code block 134 that improves output of the integral contribution by avoiding saturation of the regulator 150 under control of the present system.

Further, control code 130 is also programmed with a bumpless code block 136 to insure that a PID output signal 140 output from the controller 116 is changed in a smooth, continuous manner to prevent undesirable oscillations of the control signal, after a change in the controller gain setting, or after the controller has been enabled after being disabled. The bumpless code block 136 is programmed to reset the integral contribution as required to provide a smooth response after any of the above parameter changes. Memory 118 also stores a computed controller error 142 that is computed by computing the deviation of zone temperature from the setpoint control temperature, and that is utilized in the feedback control methodology of the present invention.

Still referring to FIG. 5, the controller maintains the temperature of the zone 112 at or near a zone temperature setpoint that is set by a zone regulator 150. The controller maintains this temperature through monitoring the zone temperature via a process variable sensor 152. The sensor 152 senses the process variable, or temperature, of the zone 112 and generates a corresponding electrical process variable signal (PV) that is fed back to the controller as indicated at 154. The controller also receives a setpoint signal (SP) 156 from a setpoint adjustment device located in zone 112 or from a programmed input. The controller processes the signals 154, 156 via the setpoint control logic 120 and the code 130 to generate the PID output control signal 140. The resulting closed loop system 160 effectively maintains the process variable of the zone 112 at or near the zone setpoint as set at the regulator 150.

Figure 6A:
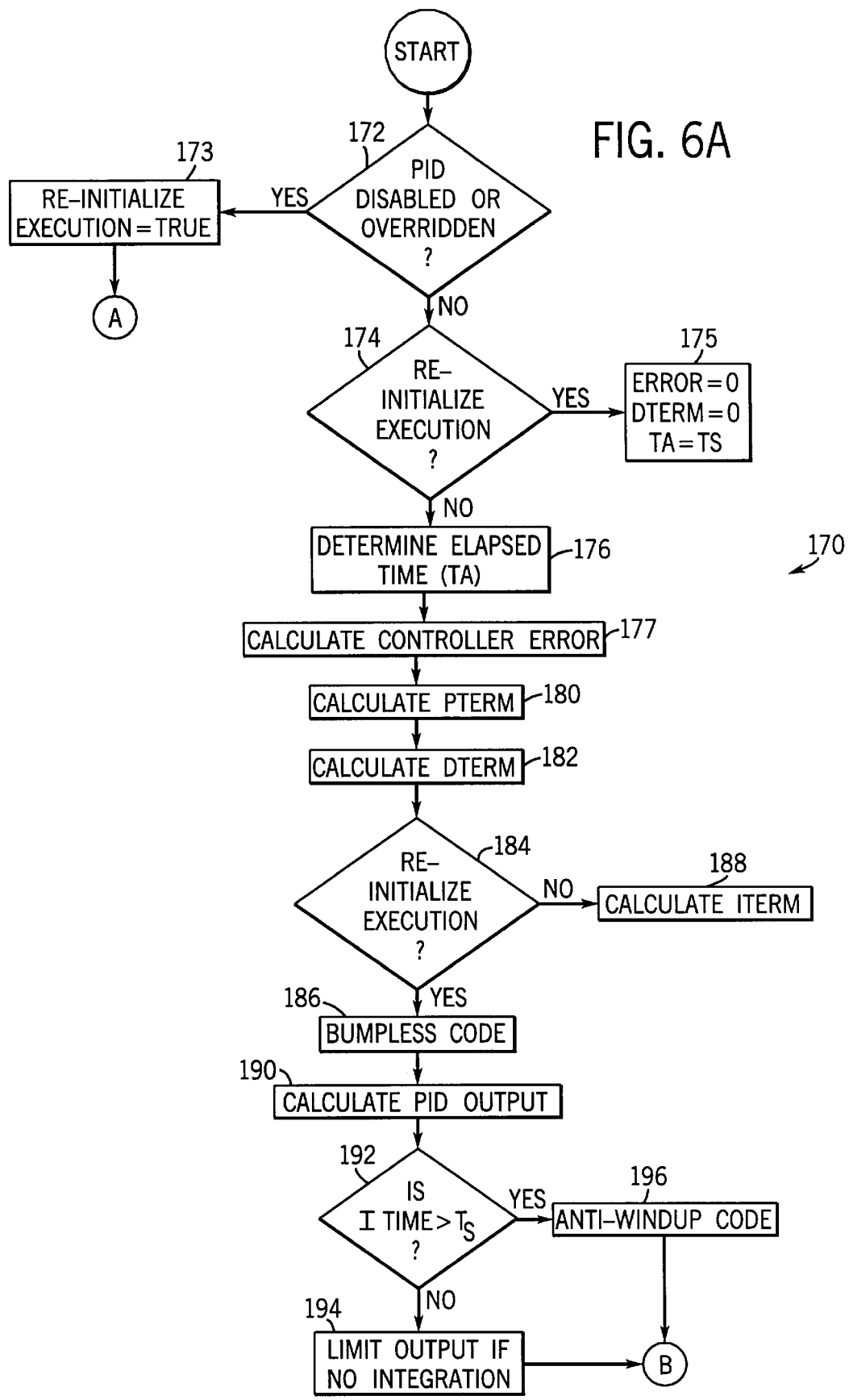
FIG. 6 is a flow diagram illustrating the control algorithm of a standard PID object using time support functions of the present invention.
Figure 6B:
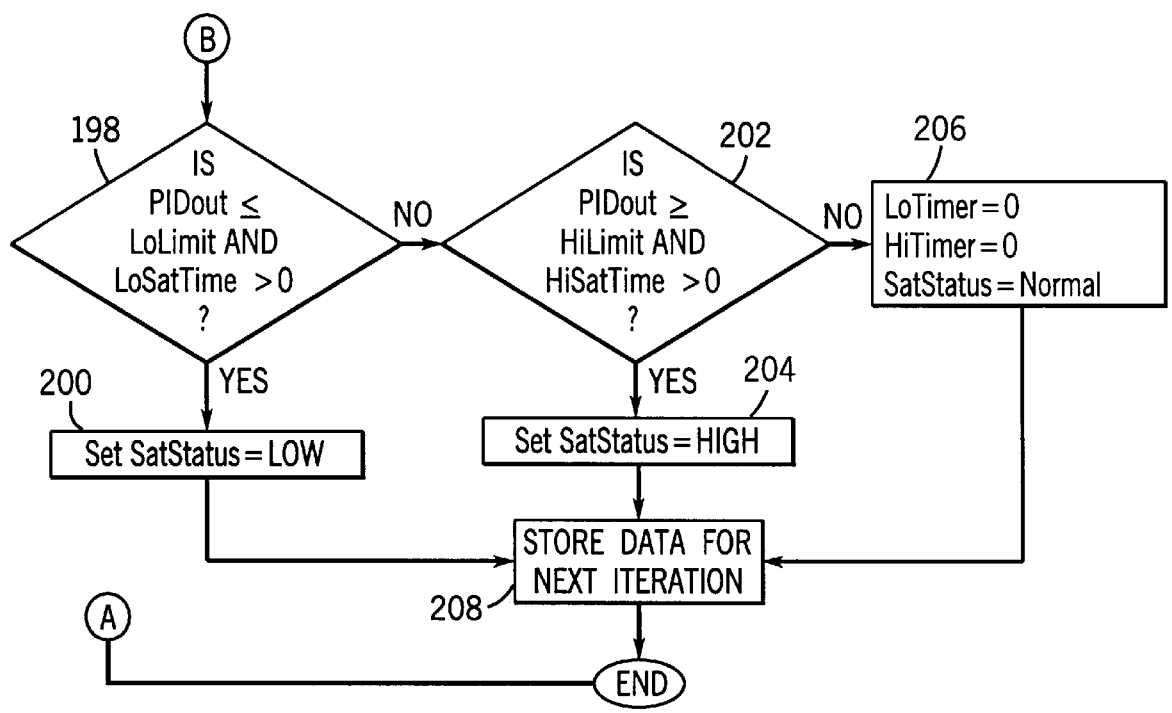
Figure 7:
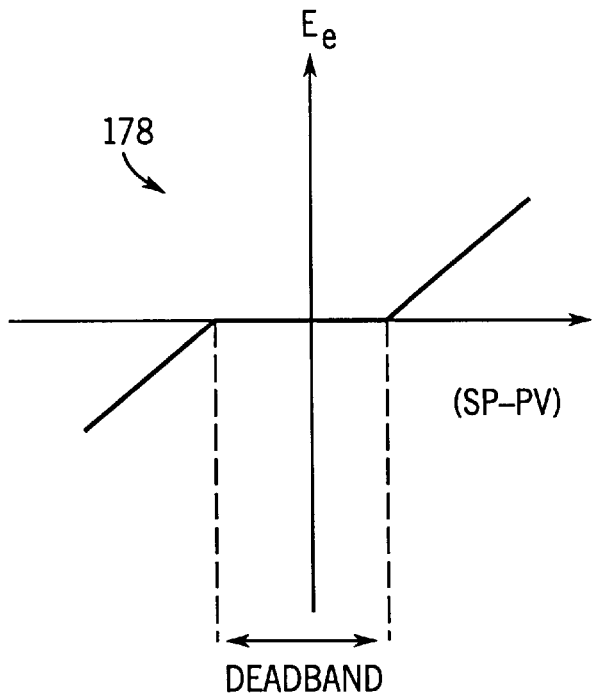
FIG. 7 is a graph of controller error as computed by the feedback control system.

Referring to FIG. 6, a flow diagram illustrating the control system logic is illustrated generally at 170. The variable "TA" signifies the elapsed time, whereas variable "TS" is scheduled time as provided by the operating environment of the present invention. As will now be described, each block shown represents a specific set of instructions encapsulated as the control method in a standard PID object.

The block 172 determines whether the control flow of the PID control system is currently disabled or overridden. If disabled, the PID output is held constant at its last enabled value, as indicated at block 173. The block 173 also maintains the PID output at the overridden value if the PID system is overridden. After the controller is enabled or released from an override or disabled state, the block 174 redirects the control flow to block 175 on the first execution, as indicated by the pseudocode (Re_Initialize=TRUE). Under normal operation (Re_Initialize=FALSE) control flow proceeds to block 176.

For the first execution after the controller is enabled or released from an override, the block 175 assigns reliable starting values for the $z^{-1}$ values of $E_c$ and the derivative response "DTerm." These values are required later for the derivative and integral response calculations. The variable "TA", which clocks the time between controller executions, is also forced to the desired execution time "TS." This prevents values of TA, which do not reflect the time between normal executions, from causing numerical problems with the integral and derivative response calculations.

For the first execution after the controller is enabled or released from an override, TA normally is not appropriate since the controller may not have been executed for an extended time period. Therefore, block 176 determines the elapsed time "TA" using the operating environment of the present invention.

The block 177 determines the controller error "$E_c$" used in calculating the controller output. The value of $E_c$ is directly proportional the difference between the setpoint and process variable (SP-PV) outside of a deadband. As shown at 178 in FIG. 7, inside the deadband, the value of "$E_c$" is zero. The deadband is used to reduce noise on the input signal from propagating through the controller. It is particularly useful if derivative control action is utilized since stability is gained and control effort is decreased by not responding to noise inside the deadband.

Figure 8:
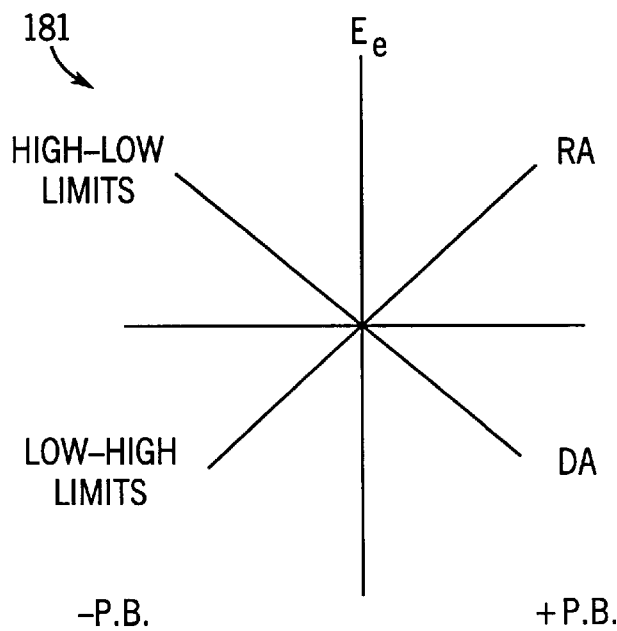
FIG. 8 is a graph of the proportional contribution to a control signal generated by the feedback control system.

The block 180 calculates the proportional response "PTerm." As shown at 181 in FIG. 8, the response is related to the value of the proportional band, high output limit, low output limit, $E_c$ and the controller action (Direct "DA" or Reverse "RA"), as indicated by the following equation:

$$PTerm = sign(K_p) * E_c$$

where:

$$K_p = \left(\frac{HiLimit - LoLimit}{ProportionalBand}\right)$$

where the sign of the proportional gain "$K_p$" is a function of the controller action. If the controller is DA then the sign of $K_p$ is (−), if RA then the sign of $K_p$ is (+).

The block 182 calculates the derivative response "Dterm." There are three cases to consider. In the first case, an invalid (negative or zero) value for the derivative time forces of the derivative response to zero.

In the second case, the derivative response is forced to zero whenever SP-PV is less than or equal to the deadband/2 (or $E_c$=0). This reduces the possibility of noise causing the derivative response to create unnecessary and undesirable changes in the controller output.

In the third case (corresponding to a non-zero $E_c$ and a valid derivative time), a derivative response which is related to the time rate of change in the process variable is generated by the following equation:

$$\frac{DTime}{N} * \frac{d(DTerm)}{dt} + DTerm = -K_p * DTime * \frac{d(PV)}{dt}$$

The characteristic solution to this equation acts as a first order filter which limits the Dterm rate of change. The filter time constant is equal is DTime/N where N is in the range of 8<N<20. This filtering helps minimize noise amplification in the derivative estimate. The particular or forced solution of this equation is related to the time varying changes in the process variable PV.

The equation is implemented using the 1st order backward finite difference equations. This approach was chosen because it does not require the input values for the PV to be evenly spaced through time. This is very important since the controller execution interval may not be uniform (e.g. TA does not always equal TS). The recursive representation of this equation used in the implementation is given below.

$$DTerm = -\frac{K_p * N * DTime}{DTime + N * \Delta t}(PV - PV_{old}) + DTerm * \frac{DTime}{DTime + N * \Delta t}$$

The Dterm is generated by the derivative function as illustrated by the following pseudocode:

if DTime<=0
then DTerm=0
if abs (SP-PV)<=deadband/2
then DTerm=DTermOld
if DTime>0 & abs(SP-PV)>deadband/2
then K1=DTime/(DTime+8*TA)
K2=(8*Kp*DTime)/(DTime+8*TA)
DTerm=K1*DTermOld−K2*((ErrorOld-Error)+(SP-SPOld))

After the DTerm is calculated, the block 184 redirects the control flow to block 186 on the first execution after the controller is enabled or released from an override. Under normal conditions the control flow would proceed to block 188.

The block 186 ensures that the controller output is "bumpless" (does not change in a discontinuous manner) when the control system is re-initialized from a disabled or overridden condition. A one time adjustment of the integral contribution "ITerm" contribution provides a smooth return to real time control. Pseudocode for the instruction block 186 is illustrated below:

ITerm=PVOid−(PTerm+DTerm+Offset)
Set: Re-Initialization=False

The block 188 calculates the ITerm under normal real time operating conditions. There are two cases to consider. In the first case, the ITerm is forced to zero if the integral time "ITime" is less than the desired sample time "TS." This prevents the possibility for numerical instability. In the second case, the controller error is integrated using trapezoidal integration. Trapezoidal integration provides better accuracy and numerical stability than rectangular integration which is commonly used in other controllers, and does not require setpoint error values to be evenly spaced through time. This is very important since the controller may not be executed with a uniform interval. The numerical implementation of the trapezoidal integration, in recursive form, is given below.

$$ITerm = ITermOld + \frac{K_p * TA}{2 * ITime} * (E_c - E_c Old)$$

Additionally, the ITerm is used to provide "bumpless" control whenever the controller gain is changed. This is highly desirable when tuning either manually or with an auto-tuning means. The bumpless adjustment is accomplished using the following equation.

ITerm=ITerm+($K_p$Old−$K_p$)*$E_c$

The block 190 sums the proportional, integral, derivative, and offset contributions to generate the PID control signal output, as indicated by the following pseudocode:

PIDOut=PTerm+ITerm+DTerm+Offset

The block 192 redirects the control flow to block 196 if the integral mode has a valid ITime and thus is enabled. If the integral mode is not enabled, the control flow proceeds to block 194.

As discussed previously, if ITime is ≦TS then the ITerm is forced to zero and there is no potential for integral windup. Therefore the purpose of the block 194 is to simply force the PID output to be between its high and low limits under all operating conditions, as indicated by the following pseudocode:

if PIDOut>=HiLimit
then PIDOut=HiLimit
elseif PIDOut<=LoLimit
PIDOut=LoLimit

When the integral action is active (ITime>TS), the block 196 prevents integral windup and dithering at the high or low output limits. Whenever the PID output exceeds the high limit it is clamped at the high limit. The output is also clamped at the high output limit if the value of PIDOld exceeds the high limit and the current value of PTerm exceeds 0. This prevents output dithering at the high limit caused by noise passing through the controller. Similar logic is used to prevent windup and dithering at the low output limit. Pseudocode for the block 196 is given below:

if ((PIDOut>=HiLimit) OR ((PIDOutOld>=HiLimit) AND (PTerm>0)))
then ITerm=HiLimit−(PTerm+DTerm+Offset)
PIDOut=HiLimit
elseif ((PIDOut<=LoLimit) OR((PIDOutOld<=LoLimit) AND (PTerm<0)))
then ITerm=LoLimit−(PTerm+DTerm+Offset)
PIDOut=LoLimit The block 198 redirects the control flow to block 200 if the PID output is≦the low output limit and the low saturation flag is enabled (LoSatTime>0). Otherwise the control flow passes to block 202.

The block 200 is used to set the PID saturation status variable SatStatus+Low if the PID output is continuously at its low limit for a time≧to LoSatTime. At each iteration, the variable LoTimer is incremented by the time elapsed from the last iteration. When LoTimer≧LoSatTime, SatStatus is set to "Low," as indicated by the following pseudocode:

LoTimer-LoTimerOld+TA
HiTimer=0
if LoTimer>=LoSatTime
then SatStatus=Low LoTimer=LoSatTime The block 202 redirects the control flow to block 204 if the PID output is≧the high output limit and the high saturation flag is enabled (HiSatTime>0). Otherwise the control flow passes to block 206.

The block 204 is used to set the PID saturation status variable SatStatus+High if the PID output is continuously at its high limit value for a time≧to HiSatTime. At each iteration, the variable HiTimer is incremented by the time since the last iteration. When HiTimer≧HiSatTime, SatStatus is set to "High." The pseudocode for block 204 is illustrated as follows:

HiTimer=HiTimerOld+TA
LoTimer=0
if HiTimer>=HiSatTime
then HiTimer=HiSatTime

The block 206 sets the PID saturation status variable SatStatus=Normal if the PID output is between its high and low limits. It also clears the timers, LoTimer and HiTimer. The SatStatus variable is used to coordinate multiple PID algorithms to prevent undesired overlap.

In the block 208, the values of the following variables are stored for the next iteration.

| | | |
|---|---|---|
| PCOld = PV | ErrorOld = Error | kPOld = Kp |
| ITermOld = ITerm | DTermOld = DTerm | LoTimerOld = LoTimer |
| POld = SP | PTermOld = Pterm | HiTimerOld = HiTimer |

The methodology is then repeated in a manner consistent with the above-described control flow according to existing zone temperatures/setpoint conditions.

As can be appreciated from the foregoing description, the PID standard object adjusts its two point sampling method based upon the elapsed time and schedule time provided by the operating environment of the present invention. This approach obviates the need for evenly spaced sample time intervals, thereby providing a higher degree of system flexibility. While this exemplary control system has been described in conjunction with a zone temperature control system, it should be appreciated that the system may be used to regulate a process variable at or near a setpoint for any closed loop control application, including pressure, flow, cascaded applications.

It is also envisioned that other standard objects will utilize the time support functions of the present invention to adjust their control methods. For instance, a Load Controller object monitors energy usage such that different loads in the building can be turned off to stay within predefined limits established by utility companies. The control method of a Load Controller object uses time support functions to monitor, forecast and adjust energy usage throughout a building.

Time support functions as provided in the present invention might also be used by the Object Engine to provide various diagnostic tools and services. Determining how well a complex set of asynchronously executing applications is running is a very difficult task in the operating environment of the present invention. To perform various diagnostics, the Object Engine must be able to determine elapsed time accurate to the microsecond. On a per device level, the Object Engine will provide exemplary diagnostic information such as: (1) an accurate measurement of current processor idle time (i.e. the percent of the processor time where nothing is being run); (2) average idle time; and (3) a list of all objects and what percentage of the processor time they are currently using. On a per object level, the Object Engine will be designed to track: (1) how much time a particular object takes to run its EXECUTE method; (2) average execution time (in msec); and (3) peak execution time (msec). As will be apparent to one skilled in the art, other diagnostic information may also be derived through the use of the time support functions of the present invention. The foregoing discloses and describes merely exemplary embodiments of the present invention. One skilled in the art will readily recognize from such discussion, and from the accompanying drawings and claims, that various changes, modifications and variations can be made therein without departing from the spirit and scope of the present invention.

APPENDIX A

WINDOWS95 and WINDOWSNT environment

```
DllExport void Osgetstarttime(TIMING_COUNTER Far * startTime)
{
LARGE_INTEGER expandedStart;
register int count;
//Determine which object engine is making the call
// !!!WE SUPPORT MULTIPLE IN THE PC PLATORM FOR SIMULATING
count = findMyRegistryEntry();
if(count != -1)
    {
    //IF we are simulating time
    if(the_guys[count].SimulateRunningTime)
        {
        //Return time from this Thread
        *startTime = the_guys[count].RunningTime;
        return;
        }
    }
// Return time from Windows
QueryPerformanceCounter(&expandedStart);
*startTime = (TIMING_COUNTER)expandedStart.QuadPart;
}
//*********************************************
/*----------------------------------------
Pseudo Code
    locate callers group & registration entry
    take difference between current time and passed time
    adjust it if it has wrapped
```

APPENDIX A-continued

```
     return it
-----------------------------------------*/
DllExport UNSIGNED32 OSgetelapsedtime(TIMING_COUNTER Far *
startTime)
{
TIMING_COUNTER endTime;
TIMING_COUNTER diff;
LARGE_INTEGER expandedEnd, freq;
FLOAT64 diffTime;
register int count;
count = findMyRegistryEntry();
if(count != -1)
   {
   //IF we are simulating time
   if(the_guys[count].SimulateRunningTime)
      {
      //get current time from this Thread
      endTime = the_guys[count].RunningTime;
      //IF the timer has wrapped around
      if(*startTime > endTime)
         diff = endTime + (~*startTime) + 1;
      else
         diff = endTime - *startTime;
      *startTime = endTime;     // return end time as the new start time
      return ((UNSIGNED32)diff);
      }
   }
QueryPerformanceCounter(&expandedEnd);
endTime = (TIMING_COUNTER)expandedEnd.Quadpart;
//IF the timer has wrapped around
if(*startTime > endTime)
   diff = endTime + (~*startTime) + 1;
else
   diff = endTime - *startTime;
*startTime = endTime;     // return end time as the new start time
QueryPerformanceFrequency(&freq);
//Calculate the usec value
diffTime = (FLOAT64)diff/(FLOAT64)freq.Quadpart*(FLOAT64)1000000.0;
return ((UNSIGNED32)diffTime);
}
                    OSRTOS386 environment (386 platform)

void OSgetstarttime(TIMING_COUNTER Far * startTime)
{
union {
   UNSIGNED32 value32;
   struct {
      UNSIGNED16 msw;
      UNSIGNED16 lsw;
      } parts;
   } t;
// The tcnt_overflow_count is incremented by an interrupt service routine
// whenever TCNT overflows. Interrupts must be enabled for this function
// to work correctly. If an overflow occurred between the first access
// of tcnt_overflow_count and the read of TCNT, bump the msw by 1.
      t.parts.msw = tcnt_overflow_count
      t.parts.lsw = inpw(TOCNT);
if (t.parts.msw != tcnt_overflow_count) // if an overflow occurred
   if (t.parts.lsw < 0 x 8000)     // before the read of TCNT
      t.parts.msw++;               // use the higher msw
*startTime = t.value32;      */
}
//****************************************************************
// OSgetelapsedtime
TIMING_COUNTER OSgetelapsedtime(TIMING_COUNTER Far * startTime)
{
//Return the elapsed time in usec
TIMING_COUNTER endTime;
TIMING_COUNTER diff;
OSgetstarttime( &endTime );
//IF the timer has wrapped around
if (*startTime > endTime)
   diff = endTime + (~*startTime) + 1;
else
   diff = endTime - *startTime;
*startTime = endTime;        // return end time as the new start time
// Return the # of counts in the timer (timer counts 3 increments per microsec)
return(diff/3);
}
```

APPENDIX A-continued

OSRTOS11 environment (68hc11 platform)

```
void Osgetstarttime(TIMING_COUNTER Far * startTime)
{
union {
   UNSIGNED32 value32;
   struct {
     UNSIGNED16 msw;
     UNSIGNED16 lsw;
     } parts;
   } t;
// The tcnt_overflow_count is incremented by an interrupt service routine
// whenever TCNT overflows. Interrupts must be enabled for this function
// to work correctly. If an overflow occurred between the first access
// of tcnt_overflow_count and the read of TCNT, bump the msw by 1.
t.parts.msw = tcnt_overflow_count;
t.parts.lsw = (UNSIGNED16)TCNT;
if (t.parts.msw != tcnt_overflow_count) // if an overflow occurred
    if (t.parts.lsw < 0 x 8000)        // before the read of TCNT
        t.parts.msw++;                 // use the higher msw
*startTime = t.value32;
}
//*********************************************
// OSgetelapsedtime
/*-----------------------------------------
Pseudo Code
   take difference between current time and passed time
   adjust it if it has wrapped and return it
-------------------------------------------*/
UNSIGNED32 OSgetelapsedtime(TIMING_COUNTER Far * startTime)
{
//Return the elapsed time in usec
TIMING_COUNTER endTime;
TIMING_COUNTER diff;
OSgetstarttime( &endTime );
//IF the timer has wrapped around
if (*startTime > endTime)
   diff = endTime + (~*startTime) + 1;
else
   diff = endTime - *startTime;
*startTime = endTime;       // return end time as the new start time
//Return the # of counts in the timer *2usec per count
return(diff * 2);
}
```

We claim:

1. A method of supporting application execution in building automation devices of a computer-implemented building automation system, comprising the steps of:

defining a plurality of common objects in a computer readable memory through instantiation such that said common objects have attributes for storing data and have methods for processing stored data;

defining an operating environment in said computer readable memory for supporting said common objects, said operating environment having a clock mechanism for maintaining time and a scheduling mechanism for initiating said methods of said common objects;

scheduling of a first control method of a first common object with said schedule mechanism for execution at a predefined schedule time;

initiating execution of said first control method by said schedule mechanism;

determining an actual time of initiation of said first control method by reading said clock mechanism; and adjusting said first control method using said actual time, when said actual time exceeds said schedule time, thereby supporting application execution.

2. The method of claim 1 wherein said first control method is further defined as a PID control method.

3. The method of claim 1 wherein said actual time is determined by reading an elapsed time from said clock mechanism and computing a difference between said elapsed time and a start time, said start time determined by reading said clock mechanism when scheduling said first control method.

4. The method of claim 1 wherein said operating environment resides on a first building automation device, said operating environment having a first operating system with an interface to said clock mechanism and a task associated with said operating system for supporting said common objects on said first building automation device.

5. The method of claim 4 wherein said task provides a clock interface that corresponds to said first operating system and said scheduling mechanism, whereby said common objects have access to said clock mechanism and said schedule mechanism for supporting application execution.

6. The method of claim 5 wherein said operating environment resides on a second building automation device having a second operating system and said task provides a second clock interface that corresponds to said second operating system, whereby said common objects have access to said clock mechanism and said schedule mechanism for supporting application execution.

7. A computer-implemented building automation system for supporting application execution in building automation devices, comprising:

a common object superclass stored in a computer readable memory that defines a plurality of common objects through instantiation such that said common objects have attributes for storing data and have methods for processing stored data;

an operating environment in said computer readable memory for supporting said common objects, said operating environment having a clock mechanism for determining time and a scheduling mechanism for initiating said methods of said common objects;

a first common object having a first control method, such that said control method is scheduled for execution at a predefined schedule time with said schedule mechanism; and said schedule mechanism initiating execution of said control method, said control method determining an actual time of initiation by reading said clock mechanism and adjusting said control method using said actual time when said actual time exceeds said schedule time.

* * * * *